US008447530B2

(12) United States Patent
Pado et al.

(10) Patent No.: US 8,447,530 B2
(45) Date of Patent: May 21, 2013

(54) HIGH DENSITY STRUCTURAL HEALTH MONITORING SYSTEM AND METHOD

(75) Inventors: Lawrence E. Pado, Saint Charles, MO (US); James P. Dunne, Ballwin, MO (US); John H. Belk, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 712 days.

(21) Appl. No.: 12/015,289

(22) Filed: Jan. 16, 2008

(65) Prior Publication Data

US 2009/0182515 A1 Jul. 16, 2009

Related U.S. Application Data

(63) Continuation-in-part of application No. 12/013,030, filed on Jan. 11, 2008, now abandoned.

(51) Int. Cl.
 *G01B 5/28* (2006.01)
(52) U.S. Cl.
 USPC ............................................. 702/36
(58) Field of Classification Search
 USPC ............................................. 702/36
 See application file for complete search history.

(56) References Cited

U.S. PATENT DOCUMENTS

| | | | |
|---|---|---|---|
| 5,195,046 A * | 3/1993 | Gerardi et al. | 702/35 |
| 6,006,163 A * | 12/1999 | Lichtenwalner et al. | 702/36 |
| 6,370,964 B1 * | 4/2002 | Chang et al. | 73/862.046 |
| 6,531,191 B1 | 3/2003 | Notenboom | |
| 2005/0075846 A1* | 4/2005 | Kim | 703/1 |
| 2006/0069520 A1* | 3/2006 | Gorinevsky et al. | 702/36 |
| 2009/0007688 A1* | 1/2009 | Foote | 73/786 |

\* cited by examiner

*Primary Examiner* — Edward Raymond
(74) *Attorney, Agent, or Firm* — McNees Wallace & Nurick LLC

(57) ABSTRACT

A method for monitoring and diagnosing the health of a structure. The method includes providing a plurality of damage monitoring units each having at least one actuator, at least one sensor and a data collection device. The sensors are arranged and disposed to measure vibration produced by the actuator and provide a signal corresponding to the measured vibration to the data collection device. The actuator is activated and the vibration is measured with the sensor. The signal is compared to a reference signal and a damage index value is determined in response to the comparison between the signal and reference signal. The damage index value is transmitted for each vibratory path to a central processing device and the damage index values are analyzed for the plurality of damage monitoring units to determine the location of damage to the structure.

17 Claims, 5 Drawing Sheets

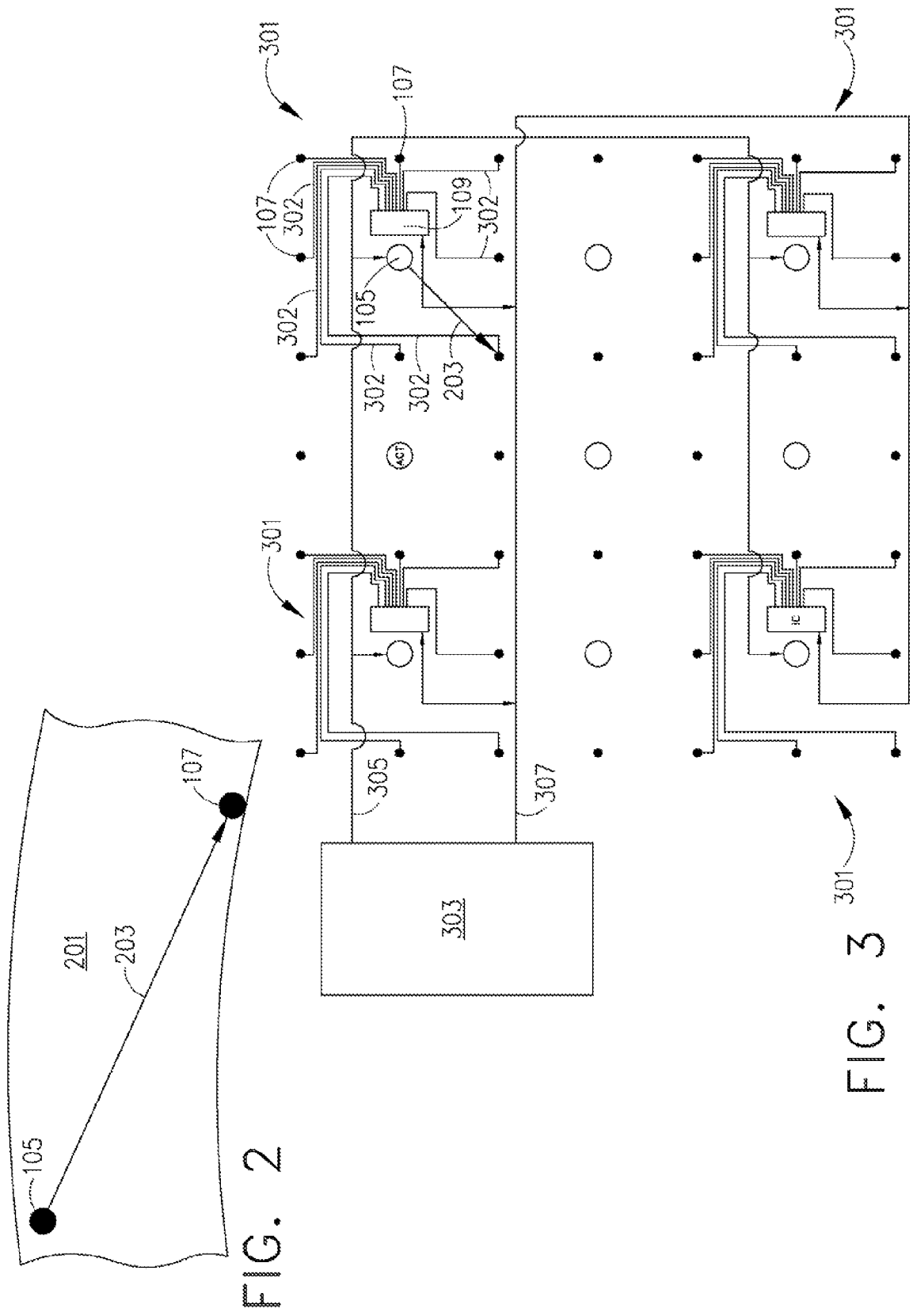

HIGH DENSITY STRUCTURAL HEALTH MONITORING SYSTEM AND METHOD

CROSS-REFERENCE TO RELATED APPLICATIONS

This application is a continuation in part of application Ser. No. 12/013,030, filed Jan. 11, 2008, for which priority is claimed and whose disclosure is incorporated by reference in its entirety.

FIELD OF THE DISCLOSURE

The present disclosure is directed to a system and method for monitoring the integrity of structural bodies. In particular, the disclosure is directed to a system and method for detecting and characterizing damage to a structural body.

BACKGROUND

Currently, inspection for damage to aircraft composite structures due to fatigue or impacts must be performed on a fixed schedule. These inspections are done to assess the integrity of the structure in question. Each inspection is time-consuming and is costly, not only in terms of time and skill needed to perform a thorough job, but also in terms of lost revenue from the aircraft being out of service. An automated onboard system for detecting and characterizing damage can eliminate this cost, except when significant damage has actually occurred. In addition, because the damage has been located and/or characterized (e.g., determination of damage size, depth, etc.), repairs can be performed more quickly by using the appropriate repair kits.

Transducers are typically large, expensive and require individual wiring. In certain applications, the additional weight of the wiring and/or the transducers may be prohibitive, especially for airborne craft. Conventional wiring is also very heavy and requires a large amount of manual labor to install. In addition, the cost of a large number of transducers applied over a large area may be prohibitive. Another drawback to the use of large, known transducers is that the signal-to-noise ratio for the long paths between the actuators and sensor is much lower than that of shorter paths. Long paths make it difficult to localize and determine the shape of a damage site.

What is needed is a lightweight scalable system and method that allows the assessment of the integrity of a structural body, including large structural bodies, in real-time or near real-time wherein the location and the characteristics of any damage present can be determined.

SUMMARY

One aspect of the disclosure includes a method for monitoring and diagnosing the health of a structure. The method includes providing a plurality of damage monitoring units each having at least one actuator, at least one sensor and a data collection device. The sensors are arranged and disposed to measure vibration produced by the actuator and provide a signal corresponding to the measured vibration to the data collection device. The actuator is activated and the vibration is measured with the sensor. The signal is compared to a reference signal and a damage index value is determined in response to the comparison between the signal and reference signal. The damage index value is transmitted for each vibratory path to a central processing device and the damage index values are analyzed for the plurality of damage monitoring units to determine the location of damage to the structure.

Another aspect of the disclosure includes a structural monitoring system for monitoring and diagnosing the health of a structure. The system includes a plurality of damage monitoring units. The damage monitoring units each include at least one actuator, at least one sensor and a data collection device. The sensors are arranged and disposed to measure vibration produced by the actuator and provide a signal corresponding to the measured vibration to the data collection device. The measured vibration corresponds to a vibratory path between the actuator and sensor. The data collection device is configured to determine a damage index value corresponding to the measured vibration. A central processing device is configured to receive and analyze damage index values from the plurality of damage monitoring units, where the central processing device is capable of determining the location and severity of damage to the structural element.

Still another aspect of the present disclosure includes a vehicle or architectural structure having a structural element and a plurality of damage monitoring units affixed to the structural element. The damage monitoring units each include at least one actuator, at least one sensor and a data collection device. The sensors are arranged and disposed to measure vibration produced by the actuator and provide a signal corresponding to the measured vibration to the data collection device. The measured vibration corresponds to a vibratory path between the actuator and sensor. The data collection device is configured to determine a damage index value corresponding to the measured vibration. A central processing device is configured to receive and analyze damage index values from the plurality of damage monitoring units, where the central processing device is capable of determining the location of damage to the structural element.

An advantage of an embodiment of the present disclosure is that the system is a low cost, low weight apparatus that provides high resolution data useable in the determination of structural damage and the characterization of that damage. Specifically, the disclosure includes lower weight of system than systems utilizing large transducers, allowing it to be placed on aircraft and on larger areas. Further, the application of the apparatus is scalable in that the system may be applied to a large variety of substrates, including large structural bodies.

The system of the present disclosure permits the use of inexpensive, low sensitivity sensors or relatively high noise sensors without sacrificing location or severity measurement. For example, low grade, inexpensive sensors may be utilized wherein the locality and severity may be determined.

Another advantage includes the ability for automated placement of features of the system, dramatically lowering costs incurred by the manual labor needed to locate and attach large transducer systems.

Still another advantage of an embodiment of the present disclosure includes a high density of actuators and sensors allows for much higher resolution in locating damage and determining its characteristics. The closely placed actuators and sensors may enable ability to track damage growth at a much finer scale, leading to much better prognostic capabilities Other features and advantages of the present invention will be apparent from the following more detailed description of the preferred embodiment, taken in conjunction with the accompanying drawings which illustrate, by way of example, the principles of the disclosure.

BRIEF DESCRIPTION OF THE DRAWINGS

FIG. 2 shows a schematic view of an actuator/sensor arrangement according to an embodiment of the present disclosure.

FIG. 3 shows a damage monitoring unit configuration according to an embodiment of the present disclosure.

Wherever possible, the same reference numbers will be used throughout the drawings to refer to the same or like parts.

DETAILED DESCRIPTION

Figure 1:
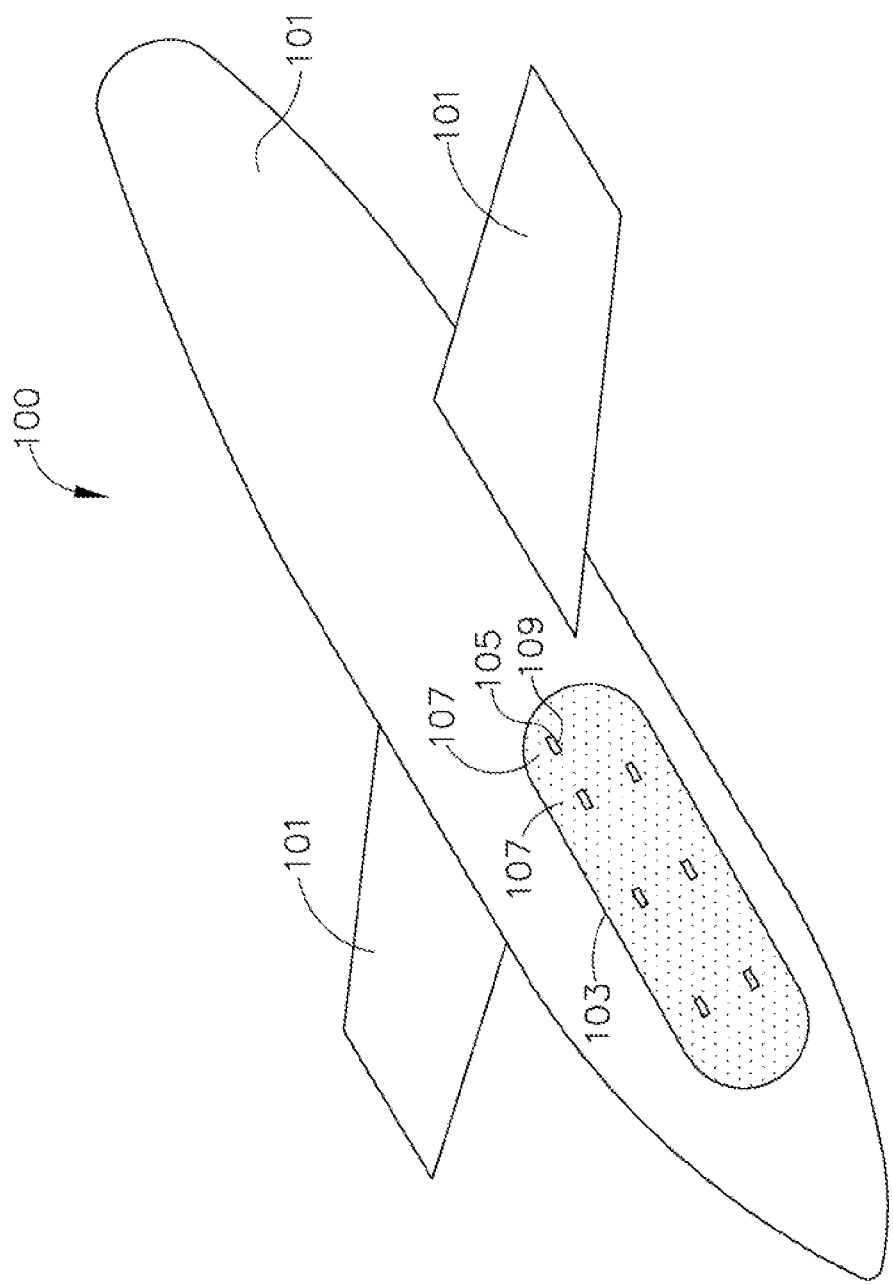
FIG. 1 shows perspective view of a vehicle with a cutaway view of a damage monitoring unit array according to an embodiment of the present disclosure.

FIG. 1 shows a vehicle 100 according to an embodiment of the disclosure. The vehicle 100 may be an aircraft, a ground vehicle, a naval vessel or any other vehicle or structure requiring structural health monitoring. The vehicle 100 includes a structural element 101, which may include, but is not limited to, a fuselage, door, panel, wing, engine component, or any other component that is susceptible to damage. The vehicle 100 includes a structural health monitoring array 103 made up of a plurality of actuators 105 and sensors 107 (see e.g., FIG. 3) arranged into a plurality of damage monitoring units 301 (see FIGS. 5-8). Each damage monitoring unit 301 includes an actuator 105, a plurality of sensors 107 and a data collection device 109. "Health monitoring", "structural health" and other uses of the term "health", as used herein include the structural integrity of a structure, component or equipment element. For example, damage to a surface or structure may include indentation, delamination (localized or otherwise), scratches, or any other damage caused by impact or other contact. In addition, damage may include a reduction in the integrity of the structure that may require analysis and/or potential repair. The array 103 includes actuators 105 and sensors 107 affixed to the structural element 101. The structural element 101 may include any material or combination of materials typically present in a conventional vehicle 100 or structure construction. For example, the structural element 101 may include metal, composite, polymer, ceramic or any other material typically utilized for construction of vehicles 100 or other structures. The actuators 105 and sensors 107 are preferably printed on the surface of the structural element 101. In one embodiment, the actuator 105, the sensors 107, the data collection device 109 and the conductive interconnections 302 may be deposited on the interior surface of the structural element 101, wherein the exposure to damage is primarily on an exterior surface. The actuators 105 are devices capable of inducing a vibration into the structural element 101. For example, the actuator 105 may be, but is not limited to a transducer, such as a piezoelectric transducer (PZT). In one embodiment, the actuator 105 is a PZT and a voltage is provided to the PZT to induce motion and/or vibration. Sensor 107 is any device capable of measuring vibration or other vibratory motion, such as, but not limited to, a transducer. Device suitable for use as a sensor may include a PZT, accelerometer, strain gage, fiber optic sensor, and/or any other device that responds to a high frequency vibration. For example, a PZT may generate a measurable voltage in response to a sensed vibration. In one embodiment of the present disclosure, sensor 107 is a PZT wherein a voltage is produced by vibration or other motion of the sensor 107 and/or structural element 101. In another embodiment, the actuator 105 and sensor 107 have a substantially identical PZT structure. By "vibration", "vibratory motion" and grammatical variations thereof, as used herein, it is meant to include reciprocal or non-reciprocal motions and/or strain within a material that are capable of being sensed and/or measured at a distance across a material. The data collection device 109 is a microprocessor, integrated circuit or other device capable of collecting and/or analyzing data provided by the sensors 107 and/or actuators 105.

The damage monitoring units 301, including the actuators 105, sensors 107 and data collection devices 109 are preferably interconnected with printed circuitry, wherein the actuators 105, sensors 107 are affixed to the structural element 101 in any suitable manner that permits the generation of vibration in the structural element 101 by actuator 105 and the measurement of vibration of the sensor 107. In one embodiment, the actuators 105 and sensors 107 are PZTs and are deposited directly onto a structural element 101 by a method such as, but not limited to fused deposition of ceramics, robocasting, micropen application, sintering onto the surface using light energy from a high energy source, such as a laser or a xenon flash lamp, or any other suitable PZT deposition process. One suitable method includes the direct sintering and using laser based sintering techniques recited in U.S. Pat. No. 6,531,191 to Notenboom, which is hereby incorporated by reference in its entirety. The deposition of the actuators 105 and sensors 107 may take place according to known techniques provided, that the attachment method permits the generation of vibration by actuator 105 and the measurement of vibration of the sensor 107. The data collection device 109 and the associated conductive interconnections 302 (see e.g., FIG. 3) may be applied using any known application and/or conductive trace printing technique, including, but not limited to direct printing or lithographic methods. Further the data collection device may be soldered, attached, formed or otherwise disposed on the structural element 101 and interconnected to the actuators 105 and sensors 107 via the conductive interconnections 302 (see FIG. 3). Suitable conductive trace printing techniques are not limited to the above and may include any low weight electrically conductive trace deposition or wireless signal transmission methods. In another embodiment, the conductive traces and/or structural monitoring system or parts thereof may be applied to a substrate, such as a polyimide film (e.g., KAPTON®) or other material that is attachable, permanently or temporarily, to the structural element. KAPTON® is a federally registered trademark of E.I. du Pont de Nemours and Company, Wilmington, Del. for polyimide films. The substrate may be applied to the structural element 101 using any suitable adhesive or application technique. The substrate permits reusability and/or portability of the damage monitoring system.

Although FIG. 1 illustrates a vehicle 100, the present disclosure is not limited to a vehicle 100 and may include any structural element, including fixed structures, such as buildings, architectural elements, bridges or other structures.

FIG. 2 shows a schematic illustration of a single path arrangement between an actuator 105 and a sensor 107. As discussed above with respect to FIG. 1, the actuator 105 and sensor 107 are applied to a substrate 201, such as a structural element 101 of a vehicle 100. The actuator 105 is activated, such as by providing a voltage or waveform voltage to the actuator 105. In response to the applied voltage, the actuator 105 induces a vibration. The vibration propagates across the substrate 201 forming a vibratory path 203. Although the vibratory path 203 is illustrated as a single straight line, it is noted that the vibration generated by the actuator 105 propagates in all directions from actuator 105 along the substrate 201. Sensor 107 senses and measures vibration and/or movement corresponding to the vibration propagating along vibratory path 203. Sensor 107 may, for example, generate a voltage in response to vibration. The voltage or a signal corresponding to the voltage can be transmitted to a data collection device 109 for collection and analyzing.

FIG. 3 shows an arrangement of a plurality of damage monitoring units 301 according to an embodiment of the present disclosure. As shown, the damage monitoring units 301 include an actuator 105, eight sensors 107 and a data collection device 109. While FIG. 3 shows an arrangement of eight sensors 107, any number of sensors 107 may be utilized including less that eight or greater than eight sensors. Likewise, additional actuators 105 and/or actuator and sensor type transducers may be utilized in the damage monitoring unit 301. The actuator 105 and the data collection device 109 are in communication with a central processing device 303. The actuator 105 and data collection device 109 may be connected to the central processing device 303 by wires, wireless connections or any other data conveying device. The central processing device 303 provides trigger signals, electrical impulse waveforms or other signals that activate the actuator 105 and result in the generation of vibration. In addition, the central processing device 303 collects data from the data collection device 109. The central processing device 303 controls the timing and performs data analysis to determine damage location and characteristics in the structural element 101. In order to activate the actuator 105, the central processing device 303 sends a signal via a trigger line 305 to the actuator 105. In one embodiment the signal may also be provided to the data collection device 109 for purposes of timing and to facilitate data collection. Further, the central processing device 303 receives data from the data collection device 109 via the data line 307. While FIG. 3 shows the trigger line 305 and data line 307 as wired connections, the communications may be provided via wireless or other data transfer method. In addition, the trigger line 305 and the data line 307 may be a single wired connection or multiple wire connections. The data collection device 109 preferably includes a microprocessor or data processing device capable of storing, analyzing and calculating data received from sensors 107. For example, while not being limited to particular parameters, the data collection device 109 may be a microprocessor or integrated circuit having the following parameters: at least about 8 analog to digital (A/D) conversion channels at 3 MHz each, about at least 1024 data points per channel; at least about 1 Kb memory storage per channel temporary, at least about 1 Kb memory storage per channel permanent, and sufficient memory to perform a calculation between two 1024 vectors. The data collection device 109 receives the data from the sensors 107 and calculates a damage index (DI) value corresponding to the data obtained. In particular, the data collection device 109 compares data obtained from sensors 107 to data previously collected from sensors 107 on undamaged structural elements 101. Alternatively the data obtained from sensors 107 may be compared to data stored corresponding to undamaged structural elements 101. Specifically, while not so limited, the data collection device 109 may perform the following calculation to determine a root mean square value damage index value ($DI_{RMSErrNorm}$):

$$DI_{RMSErrNorm} = \frac{RMS(Response_{ref} - Response_{cmp})}{RMS(Response_{ref})}$$

$Response_{ref}$ corresponds to current data (e.g., a vector of 1024 elements corresponding to measured voltages) from sensors 107. $Response_{cmp}$ corresponds to data stored by the data collection device 109, where the data corresponds to previous values obtained by the sensors 107 or from previous values stored by the data collection device 109. For example, $Response_{cmp}$ may correspond to data from sensors 107 obtained in an undamaged condition. The $DI_{RMSErrNorm}$ or Damage Index (DI) value that is returned by the data collection device 109 may be transmitted to and used by the central processing device 303 to determine the location and/or nature of any damage that is present in the structural element 101. In one embodiment, $DI_{RMSErrNorm}$ includes eight scalar answers or responses (one per channel or one per sensor element 107) that are returned representing a Damage Index or DI, which is transmitted to and used by the central processing device 303 to determine the location and/or nature of any damage that is present in the structural element 101. While the calculation shown above is a root mean square calculation, other data manipulation, algorithms or calculations may be utilized, as desired, to obtain DI values that are able to determine the location and character of damage on the structural element 101.

While, FIG. 3 is shown as including four damage monitoring units 301, additional damage monitoring units 301 may be present and may be positioned intermediate to the four damage monitoring units 301. In the embodiments including adjacent damage monitoring units 301, the actuators 105 are activated in a manner that minimizes vibration interference at the individual sensors 107. In other words, the vibratory path 203 includes a length between the actuators 105 generating the vibration and the sensors 107 measuring the vibration. This length is maintained such that the vibrations at sensors 107 are substantially free of vibrations (i.e., amplitude at the vibration is sufficiently small) generated by actuators 105 in other damage monitoring units. It is noted that for ease of viewing, only a single vibratory path 203 is shown in FIG. 3. However, a plurality of vibratory paths 203 are present originating at the activated actuators 105.

Figure 4:
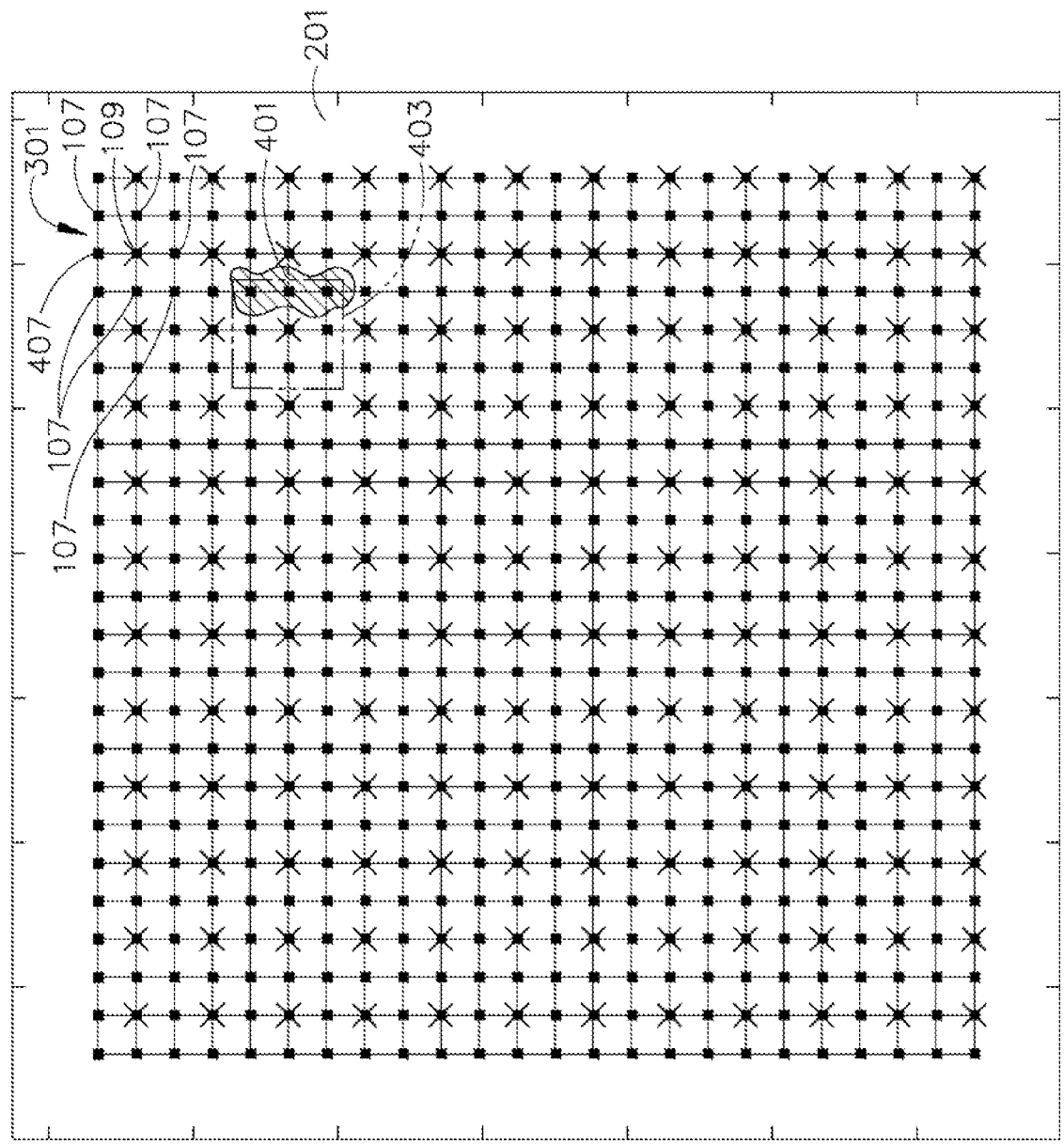
FIG. 4 shows an actuator/sensor array according to an embodiment of the present disclosure.
Figure 6:
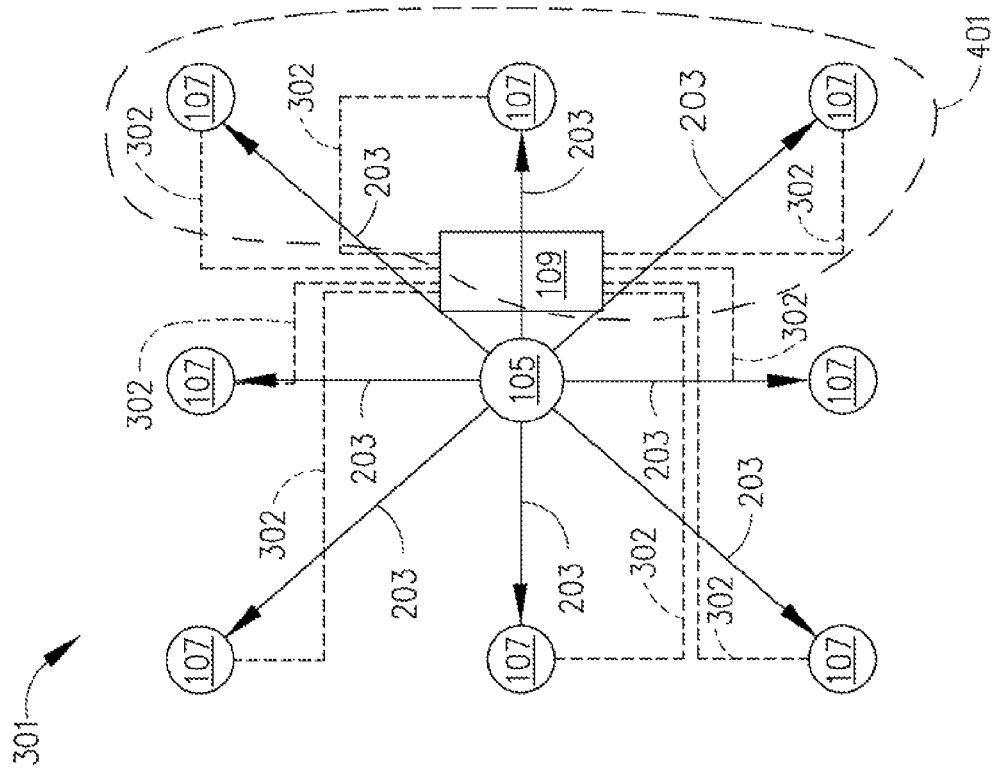
FIGS. 5-8 show a damage monitoring unit during a monitoring cycle according to an embodiment of the present disclosure.

In order to obtain high resolution health monitoring, in one embodiment of the present disclosure, a plurality of sets of damage monitoring units 301 may be arranged over large areas of the structural elements 101 (see FIG. 4). As discussed above, each damage monitoring unit 301 includes one actuator 105 and eight surrounding sensors 107. Various combinations of actuators 107 may be activated, wherein data is obtained at the data collection device 109 (not shown in FIG. 4) for each damage monitoring unit 301. As shown, substrate 201 includes an array of damage monitoring units 301 arranged to provide health monitoring over an area of substrate 201. Substrate 201 may be, for example, a structural element 101 of a vehicle 100 (see e.g., FIG. 1). The damage monitoring units 301 are arranged and preferably activated at periodic intervals to monitor the health of the structure. In addition, the damage monitoring units 301 may be activated at the same time, provided that the activated damage monitoring units 301 are sufficiently spaced to permit the vibration amplitude to sufficiently decay to reduce or eliminate undesired noise at the sensors 107 of activated adjacent damage monitoring units 301. As shown, damage 401 is present on substrate 201. The damage 401 may be caused by impact, contact, abrasion or any other type of contact that may result in scratching, delamination or other damage that may affect the mechanical or other properties of the substrate.

Figure 5:
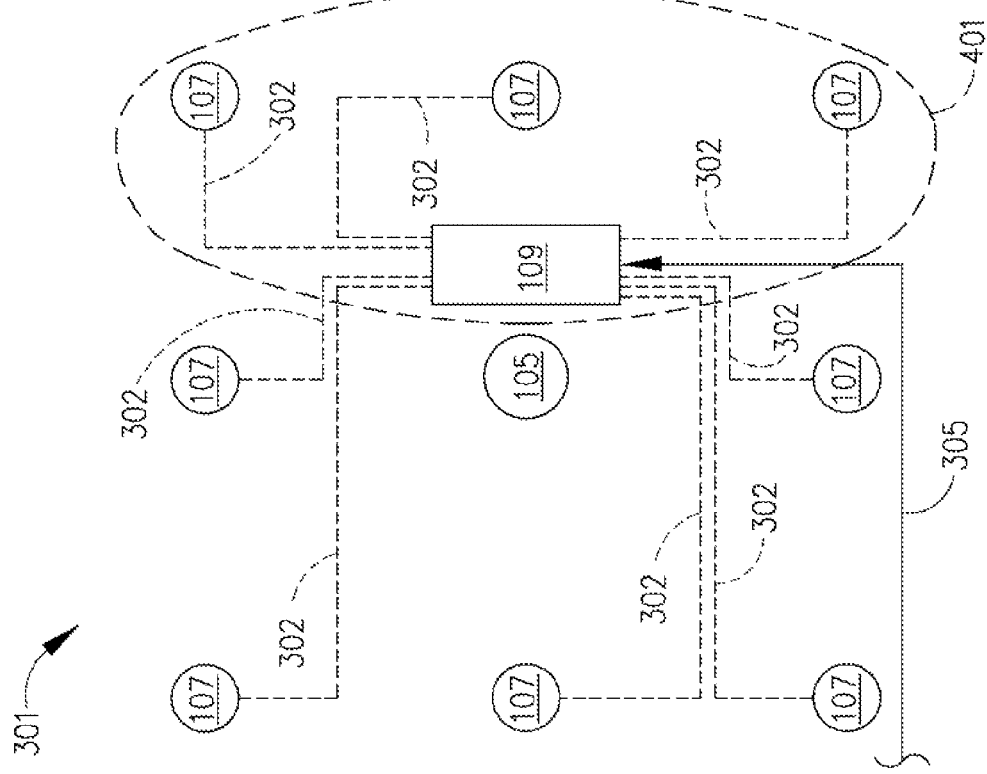
Figure 8:
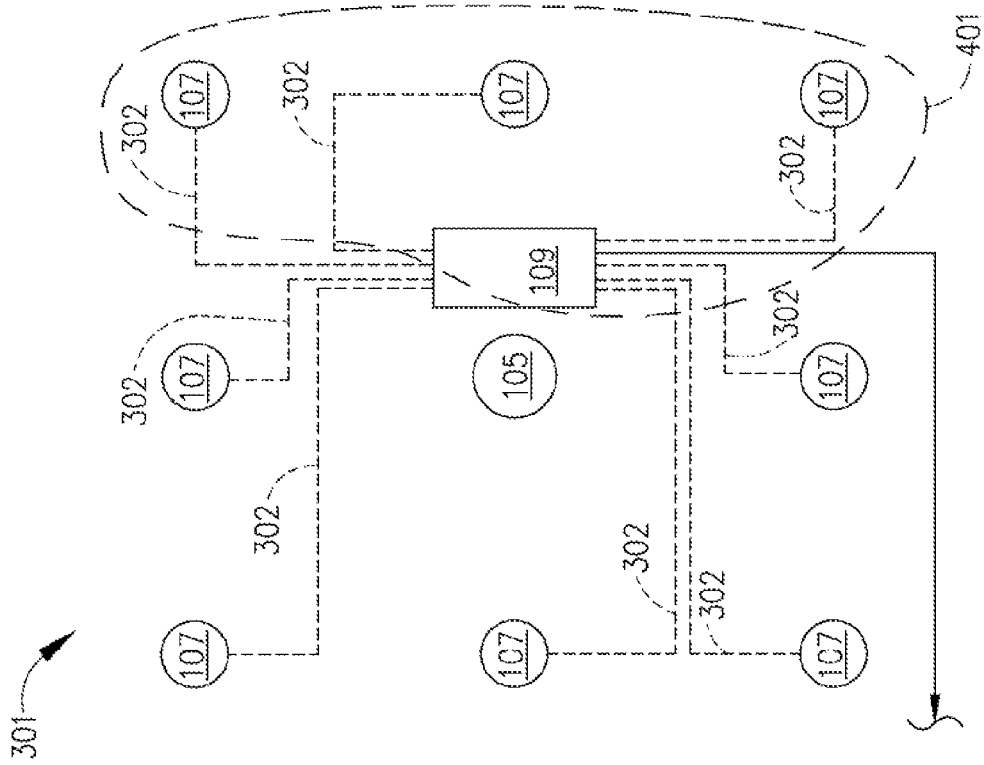
Figure 7:
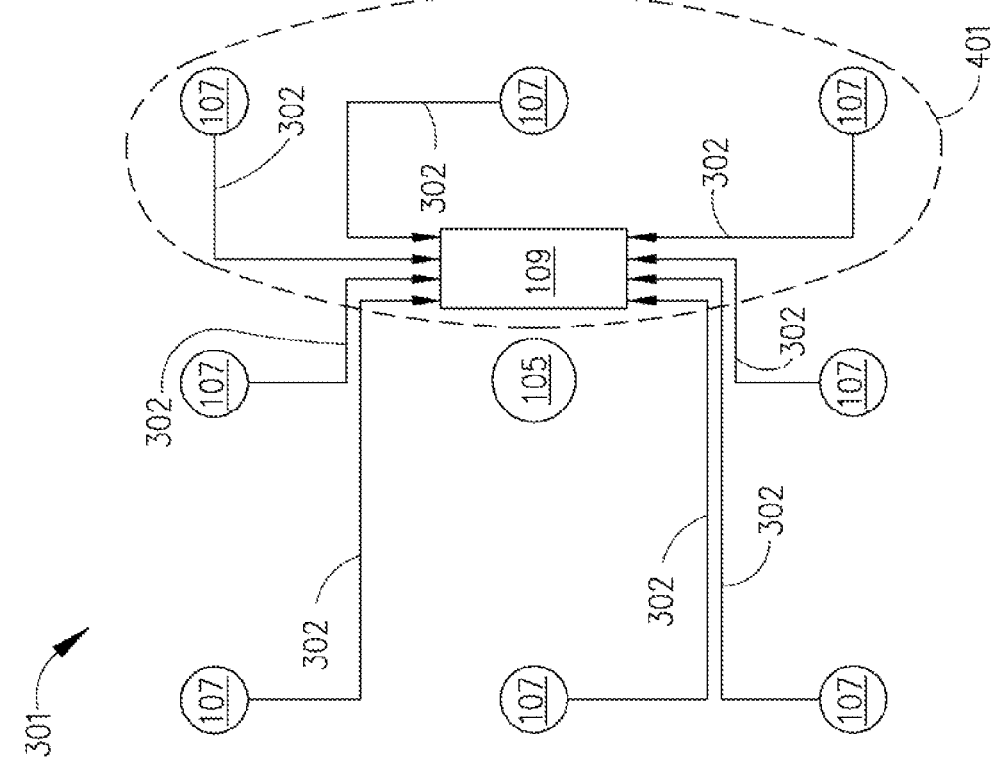

FIGS. 5-8 show a damage monitoring unit 301 during the process of monitoring the health of the substrate 201 taken from area 403 of FIG. 4. For ease of viewing, the conductive interconnections 302 are shown in broken lines. Likewise, damage 401 is shown in broken lines in FIGS. 5-8. As discussed above with respect to FIG. 1, the placement of the damage monitoring units 301 may be anywhere along the structural element 101 or substrate 201. In one embodiment, the damage monitoring units 301 (i.e., the actuator 105, the sensors 107, the data collection device 109 and the conductive interconnections 302) may be deposited on the interior surface of a vehicle, wherein the exposure to potential damage is primarily on an exterior surface. For example, the damage monitoring unit 301 may be printed onto the interior surfaces of the fuselage of an aircraft. As shown in FIG. 5, a signal from the central processing device 303 is provided to the actuator 105 and the data collection device 109 to activate the actuator 105 and to optionally prepare the data collection device 109 to receive data. The signal may be a voltage, waveform or other signal that may be used by the actuator 105 to generate vibration. In response, the actuator 105 generates a vibration that propagates across the surface of the substrate 201 and along vibratory path 203. The vibratory paths 203 travel across the substrate 201 and may be measured by the sensors 107. In particular, in one embodiment, the vibration may be converted to an electrical voltage by a PZT. As shown in FIG. 7, the sensors 107 transmit the measured vibration to the data collection device 109 and the data collection device 109 obtains and analyzes the data. In one embodiment, the data collection device 109 compares the voltages transmitted by the PZT sensors 107 to a stored set of data corresponding to an undamaged substrate 201. If the substrate 201 is substantially undamaged, the voltages measured and the voltages stored are substantially the same and the resultant DI is zero or about zero. However, if damage is present (i.e., as shown in FIGS. 4-8), the sensors 107 within the damage 401 will measure a level of vibration different than the vibration measured on an undamaged substrate 201, and therefore can characterize and locate the damage 401. In the example shown in FIG. 7, the three sensors 107 within the damage 401 return a value of DI that is non-zero, while the remaining five sensors return a DI of substantially zero. Additional factors such as magnitude of the DI may also be utilized to characterize the damage 401. As shown in FIG. 8, the DI's calculated by the data collection device 109 are transmitted to the central processing device 303 (not shown), wherein a plurality of damage monitoring units 301 also transmit the DI's in order to provide data that can determine the location and characterization of the damage 401. The characterization of damage may include the size, depth type or other feature of the damage.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for monitoring and diagnosing the health of a structure comprising
    providing a plurality of monitoring units upon a surface of the structure, the monitoring units each including at least one actuator that generates a vibration, at least one sensor a plurality of sensors and a data collection device,
    wherein the plurality of damage monitoring units are separated into groups, and
    wherein monitoring units of each group are spatially arranged to preclude interference,
    the plurality of sensors being arranged and disposed to measure vibration produced by the at least one actuator and provide signals corresponding to the measured vibration to the data collection device, the measured vibration corresponding to a vibratory path between the at least one actuator and the plurality of sensors;
    activating the at least one actuator to generate a vibration and measuring the vibration with the plurality of sensors and generating a plurality of signals corresponding to the measured vibration;
    providing the plurality of signals to a data collection device;
    comparing the plurality of signals to a reference signal;
    determining a damage index value corresponding and limited to the vibratory path in response to the comparison between the plurality of signals and reference signal with the data collection device;
    transmitting the damage index value for each vibratory path to a central processing device; and
    analyzing the damage index values for the plurality of monitoring units to determine a location of damage to the structure;
    wherein the at least one actuator and the plurality of sensors are printed onto the surface of the structure.

2. The method of claim 1, wherein one or both of the at least one actuator and the at least one sensor are piezoelectric transducers.

3. The method of claim 1, where the reference signal is obtained by measuring vibration with the at least one sensor on an undamaged structure.

4. The method of claim 1, where the reference signal is a signal corresponding to an undamaged structure.

5. A structural monitoring system for monitoring and diagnosing the health of a structure comprising:
    a plurality of monitoring units, the monitoring units each including at least one actuator that generates a vibration, a plurality of sensors and a data collection device,
    wherein the plurality of damage monitoring units are separated into groups, and
    wherein monitoring units of each group are spatially arranged to preclude interference,
    the plurality of sensors being arranged and disposed to measure vibration produced by the actuator and provide a plurality of signals corresponding to the measured vibration to the data collection device, the measured vibration corresponding to a vibratory path between the actuator and the plurality of sensors, the data collection device being configured to determine a damage index value from data consisting essentially of the measured vibration; and
    a central processing device configured to receive and analyze damage index values from the plurality of damage monitoring units, the central processing device being capable of determining the location of damage to the structure from the damage index values determined essentially by the measure vibration;
    wherein the at least one actuator and the plurality of sensors are printed onto the structure.

6. The system of claim 5, wherein the central processing device is a microprocessor that analyzes the damage index values and determines the location of damage to the structure.

7. The system of claim 5, wherein the data collection device is an integrated circuit.

8. The system of claim 5, wherein one or both of the at least one actuator and the plurality of sensors are piezoelectric transducers.

9. The system of claim 5, wherein the monitoring units include one actuator and eight sensors.

10. The system of claim 5, where the plurality of sensors and data collection device are electrically connected by printed conductive interconnections.

11. A vehicle comprising:
a structural element;
a plurality of monitoring units affixed to a surface of the structural element, the monitoring units each including at least one actuator that generates a vibration, a plurality of sensors and a data collection device,
wherein the plurality of damage monitoring units are separated into groups, and
wherein monitoring units of each group are spatially arranged to preclude interference,
the plurality of sensors being arranged and disposed to measure vibration produced by the actuator and provide a plurality of signals corresponding to the measured vibration to the data collection device, the measured vibration corresponding to a vibratory path between the actuator and the plurality of sensors, the data collection device being configured to determine a damage index value corresponding to the measured vibration; and
a central processing device configured to receive and analyze damage index values from the plurality of damage monitoring units, the central processing device determining a location of damage to the structural element by combining data damaging index values from each of the four damage monitoring groups;
wherein the at least one actuator and the plurality of sensors are printed onto the surface of the structure.

12. The vehicle of claim 11, wherein the central processing device is a microprocessor that analyzes the damage index values and determines the location of damage to the structure.

13. The vehicle of claim 11, wherein the data collection device is an integrated circuit.

14. The vehicle of claim 11, wherein one or both of the at least one actuator and the plurality of sensors are piezoelectric transducers.

15. The vehicle of claim 11, wherein the monitoring units include one actuator and eight sensors.

16. The vehicle of claim 11, wherein the sensors and data collection device are electrically connected by printed electrically conductive interconnections.

17. The vehicle of claim 11, wherein the structural element is fabricated from a material selected from the group consisting of metal, composite, polymer, ceramic and combinations thereof.

* * * * *